(12) United States Patent
Yeh et al.

(10) Patent No.: US 8,073,947 B1
(45) Date of Patent: Dec. 6, 2011

(54) METHOD AND APPARATUS FOR DETERMINING NOTABLE CONTENT ON WEB SITES

(75) Inventors: Kenneth Yeh, El Monte, CA (US); Gladys Kong, Pasadena, CA (US); Joseph Nelson, Hillsboro, OR (US)

(73) Assignee: GO Interactive, Inc., Pasadena, CA (US)

( * ) Notice: Subject to any disclaimer, the term of this patent is extended or adjusted under 35 U.S.C. 154(b) by 134 days.

(21) Appl. No.: 12/580,147

(22) Filed: Oct. 15, 2009

Related U.S. Application Data

(60) Provisional application No. 61/106,481, filed on Oct. 17, 2008.

(51) Int. Cl.
*G06F 15/173* (2006.01)
(52) U.S. Cl. .......................................................... 709/224
(58) Field of Classification Search ........... 709/223–224
See application file for complete search history.

(56) References Cited

U.S. PATENT DOCUMENTS

| | | | |
|---|---|---|---|
| 7,421,429 B2 * | 9/2008 | Thota | 1/1 |
| 2007/0038646 A1 * | 2/2007 | Thota | 707/100 |
| 2007/0073667 A1 * | 3/2007 | Chung | 707/3 |
| 2007/0198459 A1 | 8/2007 | Boone et al. | |
| 2007/0214097 A1 * | 9/2007 | Parsons et al. | 706/12 |
| 2007/0288416 A1 | 12/2007 | Ferguson et al. | |
| 2008/0201222 A1 | 8/2008 | Lahaix | |
| 2008/0235204 A1 | 9/2008 | Dai et al. | |
| 2008/0249764 A1 | 10/2008 | Huang et al. | |
| 2009/0037470 A1 | 2/2009 | Schmidt | |
| 2009/0164408 A1 * | 6/2009 | Grigorik et al. | 707/1 |
| 2009/0216524 A1 | 8/2009 | Skubacz et al. | |
| 2009/0228428 A1 | 9/2009 | Dan et al. | |
| 2009/0265332 A1 | 10/2009 | Mushtaq et al. | |
| 2010/0042618 A1 | 2/2010 | Rinearson et al. | |
| 2010/0121857 A1 | 5/2010 | Elmore et al. | |
| 2011/0082849 A1 * | 4/2011 | Rakowski et al. | 707/706 |

OTHER PUBLICATIONS

Technorati, "Technorati:About Us", http://www.technorati.com/about/, Oct. 27, 2005.*
Fujimura, Ko, et al.; The EigenRumor Algorithm for Ranking Biogs; May 2005; 6 pages; Chiba, Japan.*
BlogPulse; About BlogPulse; http://www.blogpulse.com/about.html#search; Oct. 27, 2005.*
Chime.In Inc., Non final Office Action dated Apr. 1, 2011; US Appl. No. 12/580,156.

* cited by examiner

*Primary Examiner* — Jerry Dennison
(74) *Attorney, Agent, or Firm* — Blakely, Sokoloff, Taylor & Zafman LLP

(57) ABSTRACT

A computerized method for gauging the importance of web content and presenting selected content to a user. A web site that has a plurality of comment-enabled entries is monitored, by tracking the number of comments that are posted to the entries by visitors to the web site. An average number of comments per entry is calculated. The web site is monitored over time so as to calculate a moving average, the moving average being the latest average number of comments per entry. The number of comments posted to each of the entries is compared with the moving average, to determine an importance score for each of the entries. A list of some of the entries ranked in accordance with their determined importance scores is displayed to a web user. Other embodiments are also described and claimed.

7 Claims, 2 Drawing Sheets

METHOD AND APPARATUS FOR DETERMINING NOTABLE CONTENT ON WEB SITES

This application claims the benefit of the earlier filing date of U.S. provisional application No. 61/106,481, filed Oct. 17, 2008.

BACKGROUND

On the Internet, weblogs (i.e., "blogs") are hosted on web sites and contain content such as articles of information, usually in a non-commercial aspect, that are posted by authors. For example, blogs may contain a commentary or a description written by an author on a particular topic or matter that may include text, images and/or video. Collectively, a community of weblogs may be called a "blogosphere." A significant feature of blogs includes the ability for users to respond to blog posts by submitting user feedback on a web site. User feedback is typically in the form of submitted comments from users that are then included on the intended web page or blog post.

In an autonomous network environment such as the Internet, identifying and ranking notable or important content on web sites and blogs may be accomplished using various web search and ranking algorithms. As blogs have proliferated on the Internet, the tasks of navigating, identifying and organizing blog content have also been implemented using available web search and ranking techniques. For example, an existing technique to identify and rank content on a web site relies on tracking a number of instances that the web content is linked to by other web pages. By tallying the number of web pages that link to the web content, the ranking of the web content can be determined in comparison with other web content.

However, in existing techniques, user feedback (i.e., in the form of comment data) posted on a web site or blog is not considered in ranking the web content. Therefore, an analysis of the comment data is not performed in ranking web pages.

SUMMARY

In accordance with an embodiment of the invention, a process and apparatus are described for scanning users' comments on a web site and analyzing the scanned results, to select notable content on the web site, based on the users' comments. In one instance, the importance of a web page is gauged based on a number, quality, and relevance of user feedback comments posted for that web page. In another instance, the web site is monitored over time, to calculate a moving average number of comments per web page in the site, for a given group of web pages in the web site. The number of comments posted to each one of the groups of web pages is compared to the moving average, to determine an importance score, for each one of the given group of web pages. A list of some of the web pages in the group, ranked according to their determined importance scores, is presented to a web user. The latter may be done by displaying the ranked list on an opening page of the web site (e.g., a blog that the web user is interested in). Alternatively, the ranked list may be displayed in response to a search request entered by the web user in a web search portal.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Embodiments of an apparatus and process for ranking web content using the volume and quality of reader response to determine the notability of a particular piece of content are described. In particular, an advantage over prior solutions for ranking web content is that it is the users who are familiar with a web site that in effect determine which content on that web site is important.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, functional, and other changes may be made without departing from the scope of the present invention. The following detailed description is, therefore, not to be taken in a limiting sense, and the scope of the present invention is defined only by the appended claims. It will be apparent to one of ordinary skill in the art that the embodiments may be practiced without some of these specific details. In other instances, certain structures and devices are omitted or simplified to avoid obscuring the details of the various embodiments. As used herein, a 'set' refers to any whole number of items including one item.

Figure 1:
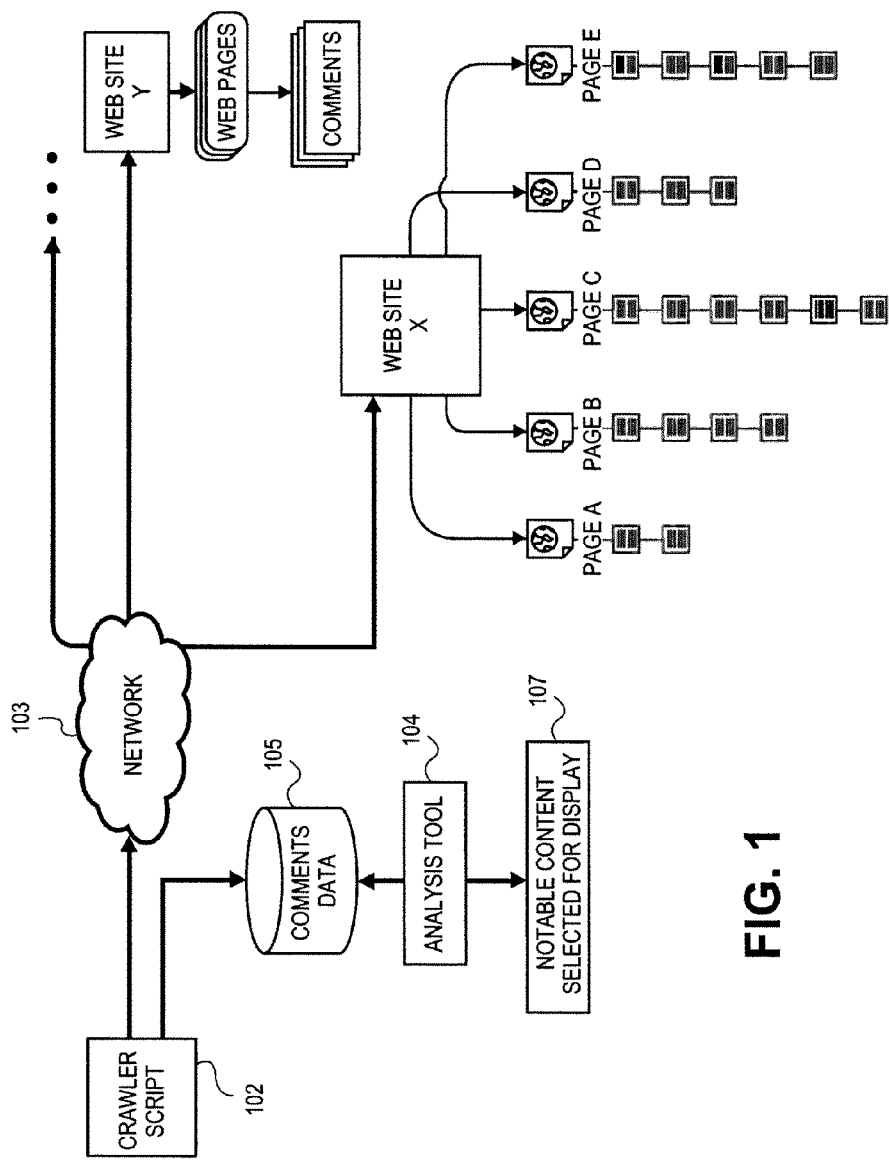
FIG. 1 is a diagram of one embodiment of an apparatus for scanning user feedback and then analyzing the scanned user feedback to determine notable content on a web site.
Figure 2:
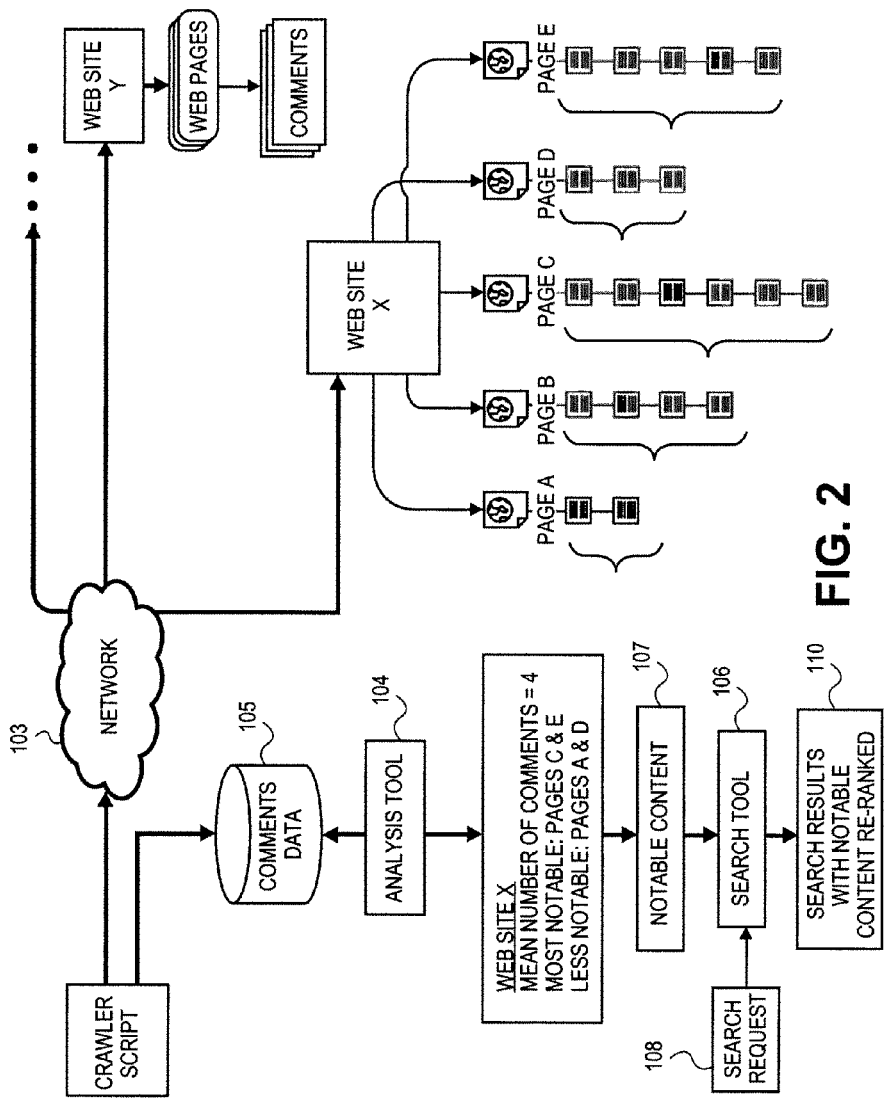
FIG. 2 is a diagram of one embodiment of an apparatus for incorporating notable content from web sites into search results.

As shown in FIG. 1 and FIG. 2, an embodiment of the invention includes the following components:

(1) a comment crawler script 102 that determines comment counts and comment text from articles (i.e., web pages or blog posts), by scanning user feedback given to a web site; and (2) tools 104, 106 to analyze the comment counts and comment text in order to select notable content. Other components include storage (comment database 105) for storing the collected comment data, and a presentation tool, not shown. An example of the latter is a web server application that makes the selected notable content (e.g., ranked content) available over a network to the web site or to another web site (e.g., a web search portal), for subsequent display on a web browser application of a web user.

Scanning User Feedback

FIG. 1 illustrates one embodiment of an apparatus including a computerized system for scanning a web site to extract user feedback as comments data and then analyze the comments data. Each of the elements in FIG. 1 may comprise hardware (e.g., circuitry, dedicated logic, disk storage, memory, etc.), software (e.g., when executing on a general purpose computer system, dedicated machine, or a distributed system), or a combination of both (e.g., programmed data processing components, or generically "programmed processor" or "programmed computer system") that communicate with one another using well known networking and data communication protocols.

In one embodiment, a crawler script 102 connects to web sites X and Y over a network 103 (e.g., a LAN, WAN or the Internet) and browses web pages on web sites X and Y. The crawler script 102 or data collector may be software that programs a client or a server computer to perform the data collection operations described here. Although two web sites are shown in FIG. 1, it should be understood that one of ordinary skill in the art could implement the crawler script 102 to browse and retrieve data from more than two web sites without departing from the scope of the invention described herein. The crawler script 102 scans posted user feedback by browsing or monitoring (over time) comment-enabled entries in the web sites in a programmatic manner. The comment-enabled entries may be web pages that provide commentary or news on various subjects. User feedback may be in the form of textual comment data (or comments) from visitors to the web sites, which comments are then said to be included on the web pages in the web sites. The user feedback may alternatively be included on a web site forum or message board hosted by the web site.

Web sites X and Y may include blogs each with its own blog posts or web pages containing comment data. The blogs on the web sites may be implemented using a particular software package such as blog software or be provided by a blog publishing/hosting service. In one embodiment, a blog post is a web page with structured feedback that allows users (viewers or visitors to the blog post) to post comments in response to the blog post. A blog post may contain an article of information submitted (uploaded) by its author and may include text, images, and/or video data. A blog post may conform to a standardized markup language (e.g., HTML or XML) that describes the appearance, structure, content, and/or semantics of the blog post, by using a set of standardized tags.

As shown in FIG. 1, the crawler script 102 may scan the web pages of Web Site X and then analyze the comments data for those web pages. For example, web site X here includes web pages A-E each with its respective set of comments. The crawler script 102 may determine that web page A has 2 comments, web page B has 4 comments, web page C has 6 comments, web page D has 3 comments, and web page E has 5 comments. The crawler script 102 may analyze each blog post or web page to determine the total number of comments that the blog post has received from users.

In one embodiment, comment data may be identified based on standardized markup language tags. In another embodiment, the crawler script 102 determines the total number of comments based on known markup language conventions used across many sites on the network (e.g., Internet) or known from using similar software. Moreover, the crawler script 102 may also rely upon custom profiles designed to obtain the total number of comments per blog post from specific sites. The crawler script 102 may also determine the total number of comments per blog post by examining the language (e.g., text data) on the page and the placement and position of the language. The crawler script 102 may obtain the total number of comments per page based on any of the aforementioned techniques alone or in combination with one another.

The blogs on web sites X and Y may include Really Simple Syndication ("RSS") feeds. RSS feeds allow web sites to syndicate content to subscribers automatically. An RSS feed may include metadata in a standardized markup language format such as XML, which includes full or excerpted text from blog posts and other data (e.g., publishing dates, authorship, links, descriptions). For example, RSS feeds on web sites X and Y may distribute data related to blog posts on web sites X and Y to users or subscribers. An RSS feed may also include a list of items related to blog posts that are presented in chronological order based on posting dates or times.

In one embodiment, the crawler script 102 may retrieve data from an RSS feed on a web site such as web site X shown in FIG. 1. The crawler script may then parse the RSS feed to extract data related to comments included on blog posts. The crawler script may extract comment data by recognizing standardized markup tags in the RSS feed. Based on the extracted data from the RSS feed, the crawler script 102 may determine the number of comments posted per blog post or web page. As an alternative or in addition to RSS, the crawler script 102 may be designed to use other mechanisms for crawling and processing web content for comments.

As further shown in FIG. 1, the crawler script 102 may store the data related to number of comments per blog post from the web sites in a comments database 105. The crawler script may retrieve the data from web pages and web sites over the network according to a predetermined schedule or frequency to update or "refresh" the data in the comments database, thereby, for example, tracking the number of comments that are posted to an entry on the web site, which allows the ranking of the entries in the web site to be repeatedly updated over time (based on a calculated moving average described further below).

In one embodiment, the comments database 105 comprises a random access memory (RAM) or other dynamic storage device, together with associated file system or database software that programs a computer to manage the storage data structures. The comments database may also comprise a non-volatile memory device (FLASH RAM). In another embodiment, the comments database comprises a non-volatile storage device such as a magnetic disk (i.e., hard drive) or a solid-state drive (SSD).

Selecting Notable Content Based on the Comment Data

FIG. 1 illustrates an analysis tool 104 that retrieves comments data stored in the comments database 105 to analyze the comments data. In one embodiment, the analysis tool 104 is implemented by processing logic that may comprise hardware (e.g., circuitry, dedicated logic, etc.), software (e.g., executed on a general purpose computer system, a dedicated machine, or a distributed system), or a combination of both.

The analysis tool 104 may determine a ranking of content from a web site or blog, based on the comments data. Based on this ranking, the analysis tool 104 may then select notable or important content 107, from the web pages or blog posts of the web site, to be presented to a web user.

In one embodiment, the analysis tool 104 calculates an average mean (i.e., an arithmetic mean) of comments per article or entry (i.e., web page, blog post) in a particular web site. For a given entry or web page in the web site, the analysis tool may calculate the deviation of the total number of comments on the web page from the average mean of comments per page for the web site. A deviation is equal to the difference relative to the average mean. The deviation of the total number of comments on a given web page or blog post from the average mean may be considered a score representing the importance of the blog post for purposes of the ranking. After having ranked one or more other entries in the web site in this manner, the analysis tool may then select the notable content 107 e.g., as the highest-ranking entries.

For example, any web page or blog post with a positive deviation (i.e., its total number of comments are greater than the average mean) may be selected as notable content 107. On the other hand, a web page or blog post that has a negative deviation (i.e., its total number of comments are less than the average mean) may not be selected as notable content 107. In another embodiment, only those web pages or blog posts that receive significantly more comments than the average mean for the web site are considered noteworthy or important. In this manner, the analysis tool 104 may pick out the notable or important content 107 from the web site or blog.

The analysis tool 104 may also use the deviation of the total number of comments in the web page, from the average mean, to compare and rank blog posts or web pages from different web sites or blogs. For example, a blog post on a first web site may be considered more notable than another blog post on a second web site when the first web site's blog post has a deviation that is greater than the deviation of the second web site's blog post. This would be the case even when, for example, the average number of comments in the first web site are smaller than the average number of comments in the second web site. In this manner, notable content 107 may be selected when comparing blog posts or pages from different web sites.

Using editorial categorization data, the analysis tool 104 may pick the top web pages or blog posts (e.g., articles) from different blogs within the same specific category. For example, blogs may be organized into categories such as entertainment, sports, lifestyle, or hobbies. These categories are not to be considered in a limiting sense and one of ordinary skill in the art may include more or less categories. The comment data in the comments database 105 may also be organized by a selected category. A web user may request to view the blogs for a specific category, and the analysis tool 104 in response may then select the notable content 107 based on the comments data specific to web sites or blogs belonging to just the selected category. In this manner, notable content 107 may be determined based on the editorial categorization data.

In one embodiment, the analysis tool 104 takes into account not just data related to comment count, deviation, and editorial categorization data, but also the age of the content, to determine notable content 107. The analysis tool 104 may factor in not just the total number of comments for a given blog post, and the deviation of the total number of comments from the average, but also the quality and relevance of each comment to determine whether the blog post or page is notable or important. The quality and relevance of each comment may be determined using conventional word count and keyword density analysis of the comment. Based on the analysis of the above factors, notable content 107 may be selected.

The selected notable content 107 may then be presented to a web user. For example, the selected notable content for a web site may be presented as a list of hyperlinks to the selected, notable web pages or entries of the web site. This may be done on the opening page (welcome or home page) of that same web site (e.g., a blog). The user may be presented with the selected notable content along with excerpts or descriptions of the corresponding web pages or blog posts. The notable content 107 that is presented to the user may include those entries that have higher importance scores (i.e., more notable) than those that are not presented. In this fashion, the analysis tool 104 may present some web content and not other web content from the same web site. In one embodiment, the displayed links corresponding to the notable content are ordered vertically on the opening page of the web site, in accordance with determined importance scores (e.g., ascending or descending order).

Incorporating With Results of a Search Request

FIG. 2 illustrates another embodiment of the invention, where notable content of web sites is incorporated into search results. Each of the elements in FIG. 2 may comprise hardware (e.g., circuitry, dedicated logic, disk storage, memory, etc.), software (e.g., when executing on a general purpose computer system, dedicated machine, or a distributed system), or a combination of both.

As in the embodiment of FIG. 1, the crawler script 104 here may monitor a web site (e.g., blog) that has comment-enabled entries or pages, by tracking the number of comments that are posted to entries (i.e., blog posts or web pages) of the web site by visitors or users to the web site. A comment-enabled web page or entry is a web page that includes an interactive feature for users to submit user feedback or comments in response to having viewed or otherwise experienced the web page or blog post. For example, the comment-enabled entry may provide commentary or news on a particular subject and, in response, users may submit feedback and comments. In one embodiment, the crawler script 104 stores data related to the number of comments that are posted to each of the entries of the web site, in the comments database 105.

The analysis tool 104 may retrieve and analyze the comment data stored in the comments database 105. The analysis tool may select notable content 107 based on deviation of the total number of comments on a page, from the average number of comments for the web site. A deviation is the difference relative to the average. A blog post or web page that receives significantly more comments than the average number of comments per blog post for a web site may be considered notable content. The deviation of the total number of comments of a blog post or web page may be considered a score that represents the importance of that particular blog post or web page.

In one embodiment, the analysis tool calculates an average number of comments per blog post or article on web site X using an arithmetic mean. For example, in FIG. 2, the average number of comments per page for web site X is the arithmetic mean, here equal to 4, based on summing the total number of comments per page (i.e., 2+4+6+3+5) and dividing by the total number of pages (i.e., 5) with comments on web site X. Thus, by comparing the respective deviations of the pages A-E to the average, the analysis tool 104 can determine that pages C and E are more notable than pages A and D on web site X.

The average number of comments per page may also be a running average. A running average takes a set of data and creates an average of one subset of the full data set at a time. For example, the analysis tool 104 may determine the running average within a defined time period (e.g., 1 hour, 1 day, 1 week, 1 month, etc.) and repeatedly and periodically calculate the average number of posts per page within that defined time period, as time goes on. The analysis tool 104 may alternatively calculate a running average based on a set number of articles or blog posts. For example, the average number of comments per page may be determined from the past 300 posted articles or pages on a blog, and this calculation can be repeated on the newest 300 articles, as time goes on.

Based on a comparison of the number of comments on a blog post/page with the average number of comments per page on a web site, the analysis tool can thus determine the relative popularity of pages on a particular web site, at a given moment in time. The relative popularity of each page may be quantified as a deviation of the total number of comments on the page, from the average number of comments. The analysis tool 104 may then determine a ranking of the blog posts/web pages on a web site based on the relative popularity of blog posts from the comparison. For example, in FIG. 2, the respective pages on web site X may be ranked in descending order from most notable to least, as pages C, E, and B, based on a deviation of the total comments in comparison with the average number of comments. In this example, pages A and D are not considered notable content because these pages do not have a total number of comments that are equal to or greater than the average number of comments. The analysis tool may then output a ranked listing of the web pages or blog posts for web site X, based on this analysis. Further, as discussed previously, the analysis tool may also use other factors (described previously in connection with FIG. 1) to determine, rank, and select the notable content 107. These other factors may include the computed or manually indicated quality and/or relevance of each of the comments posted to a given blog. The analysis tool 104 may use all of these techniques as input to inform or make the final decision about the importance score to be assigned to the given blog.

The selected notable content 107 provided by the analysis tool 104 may be incorporated with the results of a web search request 108. As shown in FIG. 2, a search tool 106 may receive the search request 108. In one embodiment, the search tool 106 may be included on a web portal or similar web site (e.g., that of a Web search service). The search tool 106 may execute the search request 108 to obtain search results. The search results may then be incorporated with the selected notable content from the analysis tool 104, into a combination 110 of, for instance, search results and re-ranked notable content. In one embodiment, the notable content 107 is re-ranked according to the results of the search request and then presented to the requesting user on a web site. In another embodiment, the notable content 107 is simply highlighted, not re-ranked, within the search results. The notable content 107 may be presented as a list of links that are re-ordered according to the search results. Alternatively, the search results may include a list of hits to web pages that are also in the notable content 107; the search results' list of hits is then re-ranked according to their importance scores as reflected in the notable content 107 (which was calculated using the concept of deviation as explained above).

To conclude, various aspects of a technique for determining notable content on a web site and displaying a ranking to a browsing user based on it, have been described. As explained above, an embodiment of the invention may be a machine-readable medium (e.g., Compact Disc Read-Only Memory, server computer storage) having stored thereon instructions which program a processor or computer system to perform some of the operations described above. In other embodiments, some of these operations might be performed by specific hardware components that contain hardwired logic. Those operations might alternatively be performed by any combination of programmed data processing components and fixed hardware circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A computerized method for gauging the importance of web content and presenting selected content to a user, comprising:
    monitoring a web site that has a plurality of comment-enabled entries, by tracking the number of comments that are posted to the entries by visitors to the web site;
    calculating an average number of comments per entry, of said plurality of comment-enabled entries;
    monitoring the web site over time so as to calculate a moving average, the moving average being the latest average number of comments per entry, of said plurality of comment-enabled entries; and
    comparing the number of comments posted to each of the entries with the moving average, to determine an importance score for each of the entries, and displaying to a web user a list of some of the entries ranked in accordance with their determined importance scores.

2. The method of claim 1, wherein the moving average is determined for a time period.

3. The method of claim 1, wherein the moving average is determined for a fixed number that represents the latest number of comment-enabled entries in the web site.

4. A computerized method for gauging the importance of web content and presenting selected content to a user, comprising:
    calculating an average number of comments per entry in a web site, wherein the web site includes a plurality of comment-enabled entries;
    monitoring the web site over time so as to calculate a moving average, the moving average being the latest average number of comments per entry in the web site;
    computing a difference between (1) the moving average and (2) a first number of comments posted to a first entry in the web site, to determine a first deviation;
    computing a difference between (1) the moving average and (2) a second number of comments posted to a second entry in the web site, to determine a second deviation;
    ranking the first entry higher than the second entry when the first deviation is greater than the second deviation; and
    displaying said ranking to a web user.

5. The method of claim 4 wherein displaying said ranking to a web user comprises:
    displaying the first and second entries on the opening page of the web site in order of rank.

6. A computer system for gauging the importance of web content comprising:
    a data collector to be coupled to a network to monitor a web site on the network that has a plurality of comment-enabled entries and collect comment data for said entries;
    storage to store the collected comment data;
    a data analyzer to calculate what is an average number of comments per entry for said entries, using the stored comment data, determine whether a first number of comments in a first entry in the web site is less than the average number of comments per entry; and
    a presentation tool to present the first entry to a web user when the first number of comments is not less than the average and omit the first entry when the first number of comments is less than the average.

7. The system of claim 6 wherein the presentation tool is to present or omit the first entry to the web user on the opening page of the web site.

* * * * *